US010358735B2

(12) United States Patent
Gebregiorgis

(10) Patent No.: US 10,358,735 B2
(45) Date of Patent: Jul. 23, 2019

(54) ANTI-CORROSION ELECTROCOAT

(75) Inventor: Taddesse Gebregiorgis, Rochester, MI (US)

(73) Assignee: Axalta Coating Systems IP Co., LLC, Wilmington, DE (US)

(*) Notice: Subject to any disclaimer, the term of this patent is extended or adjusted under 35 U.S.C. 154(b) by 0 days.

(21) Appl. No.: 14/119,584

(22) PCT Filed: May 23, 2012

(86) PCT No.: PCT/US2012/039084
§ 371 (c)(1),
(2), (4) Date: Mar. 17, 2014

(87) PCT Pub. No.: WO2012/162359
PCT Pub. Date: Nov. 29, 2012

(65) Prior Publication Data
US 2014/0190836 A1 Jul. 10, 2014

Related U.S. Application Data

(60) Provisional application No. 61/488,912, filed on May 23, 2011.

(51) Int. Cl.
| | |
|---|---|
| *C25D 9/10* | (2006.01) |
| *C25D 13/22* | (2006.01) |
| *C09D 5/24* | (2006.01) |
| *C09D 5/44* | (2006.01) |
| *C25D 15/00* | (2006.01) |
| *C09D 7/61* | (2018.01) |

(52) U.S. Cl.
CPC .......... *C25D 9/10* (2013.01); *C09D 5/24* (2013.01); *C09D 5/443* (2013.01); *C09D 7/61* (2018.01); *C25D 13/22* (2013.01); *C25D 15/00* (2013.01)

(58) Field of Classification Search
CPC . C25D 9/10; C25D 5/50; C25D 13/22; C25D 5/10; C09D 5/24; C09D 7/1216; C09D 5/443
See application file for complete search history.

(56) References Cited

U.S. PATENT DOCUMENTS

| | | | | |
|---|---|---|---|---|
| 4,375,498 A * | 3/1983 | Le Minez | ............. | B05D 7/542 |
| | | | | 204/488 |
| 4,988,420 A * | 1/1991 | Batzill et al. | ................. | 204/484 |
| 5,035,785 A * | 7/1991 | Debroy et al. | ................ | 204/503 |
| 5,178,736 A * | 1/1993 | Richardson | ............. | H01B 1/20 |
| | | | | 204/484 |
| 5,837,766 A * | 11/1998 | Metro | ..................... | C08K 3/04 |
| | | | | 252/511 |
| 5,908,667 A * | 6/1999 | Blum | .................... | B05D 7/576 |
| | | | | 427/195 |
| 6,027,626 A | 2/2000 | Kurosawa et al. | | |
| 6,248,225 B1 | 6/2001 | Palaika et al. | | |
| 6,436,260 B1 | 8/2002 | Lorenz et al. | | |
| 6,447,931 B1 * | 9/2002 | Miyatake | ................. | C09D 5/24 |
| | | | | 204/484 |
| 2004/0118695 A1 | 6/2004 | Chung | | |
| 2005/0194253 A1 * | 9/2005 | Hanatani | ............. | C09D 5/4492 |
| | | | | 204/500 |
| 2009/0258981 A1 * | 10/2009 | Hartung | ................ | C09D 5/086 |
| | | | | 524/288 |
| 2009/0269511 A1 * | 10/2009 | Zhamu | ................... | B82Y 30/00 |
| | | | | 427/558 |
| 2010/0163424 A1 * | 7/2010 | Chouai | ............. | C08G 59/1422 |
| | | | | 205/205 |

FOREIGN PATENT DOCUMENTS

| | | |
|---|---|---|
| GB | 2129807 A | 5/1984 |
| WO | 2004033523 A1 | 4/2004 |

OTHER PUBLICATIONS

ISA Korean Intellectual Property Office, International Search Report for Application No. PCT/US2012/039084, filed Dec. 6, 2012.
ISA Korean Intellectual Property Office, International Preliminary Report on Patentability for Application No. PCT/US2012/039084, filed Dec. 5, 2013.
EPO, Extended European Search Report for Application No. 12788852.7, dated Jun. 24, 2015.

* cited by examiner

*Primary Examiner* — Kishor Mayekar
(74) *Attorney, Agent, or Firm* — Lorenz & Kopf, LLP

(57) ABSTRACT

The present disclosure relates to the application of anti-corrosion coatings for a ferrous substrate. The first coating applied to the ferrous substrate is an electrocoat composition comprising electrically conductive pigments. A dried a cured coating layer of the first electrocoat composition provides the basis for a second electrocoat composition.

16 Claims, No Drawings

ANTI-CORROSION ELECTROCOAT

CROSS-REFERENCE TO RELATED APPLICATIONS

This application is a U.S. National-Stage entry under 35 U.S.C. § 371 based on International Application No. PCT/US2012/039084, filed May 23, 2012 which was published under PCT Article 21(2) and which claims priority to U.S. Application No. 61/488,912, filed May 23, 2011, which are all hereby incorporated in their entirety by reference.

TECHNICAL FIELD

The present disclosure is directed to a process for coating a substrate with an anti-corrosion composite coating. The process comprises the steps of applying a first electrocoat composition to a substrate, wherein the electrocoat composition comprises conductive pigment. The applied layer of electrocoat composition is dried and cured and is followed by a second application of an electrocoat composition that is different from the first electrocoat composition.

BACKGROUND

The anti-corrosion treatment of ferrous metals is important in many industrial applications, especially in the automobile and transportation industry. The development of phosphatizing washes followed by the application of a cationic electrocoat composition has been one of the most important advances in providing vehicles that resist the corrosion of the underlying substrate for long periods of time.

A typical anticorrosion treatment begins with the cleaning of a ferrous substrate to remove dirt, grease, oil or other contaminants that may have a harmful effect on the overlying coatings. The cleaned substrate can then be subjected to one or more pretreatment steps including a phosphate wash, typically iron phosphate or zinc phosphate. The deposited phosphate layer provides very good corrosion resistance to the substrate.

Next, the prepared substrate can be coated by an electrocoat composition. Electrocoat compositions typically comprise an aqueous dispersion or emulsion of a film-forming epoxy resin having ionic stabilization. In automotive or industrial applications for which durable electrocoat films are desired, the electrocoat compositions are formulated to be curable (thermosetting) compositions. This is usually accomplished by emulsifying the epoxy resin and a crosslinking agent that can react with functional groups on the epoxy resin under appropriate conditions, such as with the application of heat to form a durable crosslinked network. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating. Once the electrocoat composition has been applied and cured, the substrate can then be subjected to the remaining painting steps including application of primer, basecoat and clearcoat layers to provide a durable aesthetically pleasing finish.

The pretreating and phosphating steps can constitute up to 10-12 separate process steps and significantly lengthens the painting process during the manufacturing of the article. It is desired to remove one or more of these steps while still providing a coated ferrous substrate that has the desired levels of corrosion resistance during the service life of the article. In addition, other objects, desirable features and characteristics will become apparent from the subsequent summary and detailed description, and the appended claims, taken in conjunction with the accompanying drawings and this background.

SUMMARY

The present disclosure is directed to the coating of a ferrous substrate comprising the steps of:
1) providing a first bath comprising a conductive pigment-containing electrocoat composition;
2) placing the ferrous substrate at least partially into the first bath;
3) passing an electric current through the first bath and the ferrous substrate to deposit a layer of the conductive pigment-containing electrocoat composition onto at least a portion of the substrate;
4) removing the ferrous substrate from the first bath;
5) rinsing the coated substrate with water;
6) heating the ferrous substrate to cure the applied layer of conductive pigment-containing electrocoat composition;
7) providing a second bath comprising a second electrocoat composition;
8) placing the ferrous substrate at least partially into the second bath;
9) passing an electric current through the second bath and the ferrous substrate to deposit a layer of the second electrocoat composition onto at least a portion of the layer of conductive pigment-containing electrocoat composition;
10) removing the coated substrate from the second bath;
11) rinsing the coated substrate with water; and
12) heating the substrate to cure the applied layer or layers of electrocoat composition, wherein the conductive pigment-containing electrocoat composition comprises:
    A) a pigment, consisting of conductive pigment;
    B) an epoxy resin; and
wherein the conductive pigment-containing electrocoat composition has a pigment to binder ratio in the range of from about 0.1:1 to about 1:1.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

The phrase "ferrous substrate" means a conductive metal substrate that contains iron. Suitable examples can include, for example, iron, cast iron, wrought iron, steel, carbon steel, cold rolled steel, stainless steel, steel alloys. Excluded from this definition is a ferrous substrate that has been pre-treated with a phosphate coating.

The phrase "conductive pigment" means a pigment having low enough resistance to allow the passage of electric current through or over it, i.e. having maximum powder specific resistivity in ohm-centimeters of 125 when under 2 metric tons of compression.

It has been found that an electrocoating process that deposits two layers of electrocoat compositions on the surface of a ferrous substrate can provide the substrate with a corrosion resistant finish. The improvement in corrosion resistance is found when compared to that of the corrosion resistance of a single electrocoat composition over a hot dipped galvanized ferrous substrate.

The process according to the present disclosure comprises the steps of:
1) providing a first bath comprising a conductive pigment-containing electrocoat composition;
2) placing the ferrous substrate at least partially into the first bath;
3) passing an electric current through the first bath and the ferrous substrate to deposit a layer of the conductive pigment-containing electrocoat composition onto at least a portion of the substrate;
4) removing the ferrous substrate from the first bath;
5) rinsing the coated substrate with water;
6) heating the ferrous substrate to cure the applied layer of conductive pigment-containing electrocoat composition;
7) providing a second bath comprising a second electrocoat composition;
8) placing the ferrous substrate at least partially into the second bath;
9) passing an electric current through the second bath and the ferroussubstrate to deposit a layer of the second electrocoat composition onto at least a portion of the layer of conductive pigment-containing electrocoat composition;
10) removing the coated substrate from the second bath;
11) rinsing the coated substrate with water; and
12) heating the substrate to cure the applied layer or layers of electrocoat composition, wherein the conductive pigmentcontaining electrocoat composition comprises:
A) a pigment, consisting of conductive pigment;
B) an epoxy resin; and wherein the conductive pigment containing electrocoat composition has a pigment to binder ratio in the range of from 0.1:1 to 1:1.

The first bath comprises a conductive pigment-containing electrocoat composition. The electrocoat composition comprises an epoxy resin and other additives that are typically incorporated into electrocoat compositions. The pigment consists of conductive pigment. In some embodiments, the conductive pigment can be conductive carbon black, graphene, a metal pigment that resists oxidation during the application process and a combination thereof. The conductive pigment may be selected from the group consisting of aluminum pigment, conductive carbon black, grapheme and a combination thereof.

The electrocoat composition comprises a film-forming binder, which comprises a neutralized chain extended epoxy resin and a crosslinking agent. The epoxy resin can be any of those epoxy resins that are commonly used in cationic electrocoat compositions. Suitable epoxy resins include, for example, epoxy extended aromatic polyols, epoxy functional acrylic polymers, epoxy functional polyesters or combinations thereof In some embodiments, the epoxy resin can be formed by the reaction product of a polyol with an epoxy compound, such as, for example, epichlorohydrin. In further embodiments, the epoxy resin comprises the reaction product of an aromatic polyol, such as, for example, bisphenol A with epichlorohydrin in the presence of a base. The molecular weight of the epoxy resin, as measured as the weight per epoxy group, can be in the range of from 400 to 5,000. In some embodiments the weight per epoxy is in the range of from 800 to 3,000. The epoxy resin preferably has two or more epoxy groups, which can then be chain extended with amines and then the amine groups can be neutralized with acid to form neutralized chain extended epoxy resin. Suitable amines that can be used include, for example, alkyl amines, dialkyl amines, diketimines, alkyl carbamate amines, hydroxyalkyl carbamate amines and combinations thereof In some embodiments, the amines can be hydroxyalkyl carbamates having a formula according to (I);

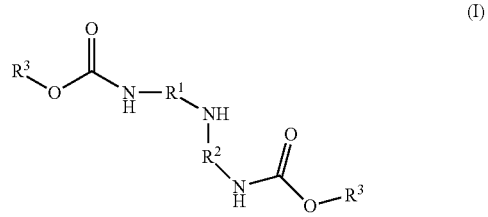

wherein $R^1$ is an alkyl group having in the range of from 1 to 10 carbon atoms, $R^2$ is an alkyl group having in the range of from 1 to 10 carbon atoms and wherein each $R^3$ can be the same or different and is a hydroxyl alkyl group having in the range of from 1 to 10 carbon atoms. Suitable acids for neutralizing the chain extended epoxy resin can include, for example, acetic acid, alkyl sulfonic acids, phosphonic acids and a combination thereof Typically, the neutralization step is performed in water or a mixture of water and organic water soluble co-solvents to form an aqueous dispersion of the film forming binder.

The neutralized chain extended epoxy resin can then be blended with a crosslinking agent, typically a blocked polyisocyanate, to form the film forming binder. Preferred crosslinkers for the epoxy amine adduct resins are also well known in the art. These can include, for example, aliphatic, cycloaliphatic and aromatic isocyanates such as hexamethylene diisocyanate, cyclohexamethylene diisocyanate, toluene diisocyanate, methylene diphenyl diisocyanate and the like. These isocyanates can be reacted with a blocking agent such as, for example, oximes, alcohols, caprolactams or a combination thereof Upon heating, the blocking agent separates, thereby providing a reactive isocyanate group and crosslinking occurs. Isocyanate crosslinking agents and blocking agents are well known in the prior art.

The electrocoat composition also comprises conductive pigments. In some embodiments, the conductive pigments can be selected from the group consisting of conductive carbon black, graphene, a metal pigment that resists oxidation during the application process and a combination thereof In further embodiments, the conductive carbon black can be a nanoscale pigment particle having an average particle size in the arrange of from 10 nanometers to 200 nanometers, as measured, for example, by light scattering techniques. In other embodiments, the conductive carbon black pigment can have an average particle size in the range of from 20 nanometers to 150 nanometers.

The conductive pigments can be incorporated into the electrocoat composition in a variety of methods. In some embodiments, the conductive pigments are carbon black and the carbon black pigments are dispersed with a dispersing agent, for example, an alkylene oxide extended styrenated phenol. The alkylene oxide extended styrenated phenol can have a structure according to formula (II):

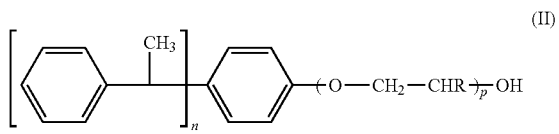

wherein R is hydrogen or methyl, n is in the range of from 1 to 3 and p is in the range of from 1 to 100. In some embodiments, R is hydrogen, n is, on average, between 2 and 3 and p is in the range of from 5 to 15. One commercially available example of the alkylene oxide extended styrenated phenol is SYNFAC® 8334, available from Milliken Chemicals, Spartanburg, S.C. To disperse the conductive carbon black pigments, the pigments and the dispersing agent can be combined, optionally with a solvent in a mill, such as, for example, a sand mill, and mixed until the desired pigment dispersion is formed. Other methods to disperse the conductive pigments are known and can be used.

The electrocoat composition can contain other additives that are commonly used in cationic electrocoat compositions. Suitable additives can include, for example, catalysts, anticrater additives, rheology control additives, defoamers, antimicrobial compounds and a combination thereof In some embodiments, the catalyst can be dibutyl tin oxide, bismuth oxide, bismuth trioxide or a combination thereof.

The ferrous substrate can be cleaned to remove dirt, grease or other contaminants prior to applying a layer of the first electrocoat composition containing a conductive pigment. Suitable pretreatment methods are known in the art and can be used. It is an object of the present disclosure to provide anticorrosion coatings without the treatment of the ferrous substrate using phosphate washes as is commonly performed in the art. Therefore, the substrate is essentially free from a phosphate coating.

Once the ferrous substrate has been suitably cleaned, the substrate can be placed at least partially in a bath containing the electrocoat composition comprising a conductive pigment. In some embodiments, the entire substrate is submerged in the bath containing the electrocoat composition comprising a conductive pigment allowing a layer of the coating composition to be applied over the entire portion of the substrate contacting the bath. A current is passed through the bath and the substrate to deposit a layer of the electrocoat composition onto at least a portion of the substrate. The thickness of the applied layer is a function of the bath temperature, the applied current and other factors as is known in the art. Typically, a layer of the applied electrocoat composition can be in the range of from 5 micrometers to 50 micrometers.

Once the layer of electrocoat composition has been applied to at least a portion of the substrate, the substrate can be removed from the bath and rinsed with water. The at least partially coated substrate can then be heated to a metal temperature in the range of from 140° C. to 240° C. for 5 to 60 minutes to dry and cure the applied layer of electrocoat composition comprising a conductive pigment. The substrate can then be cooled to a temperature in the range of from ambient temperature to 100° C.

The application of the first electrocoat composition comprising a conductive pigment forms a conductive coating on at least a portion of the substrate. The substrate can then be placed at least partially into a second electrocoat bath. In some embodiments, the entire substrate is submerged in the bath containing the electrocoat composition allowing a layer of the coating composition to be applied over the entire portion of the substrate contacting the bath. The second bath can be a different electrocoat composition. Any suitable cationic electrocoat composition can be used. In some embodiments, the second electrocoat composition can be CORMAX® 6 electrocoat, available from DuPont, Wilmington, Del. Other cationic electrocoat compositions are known and can be used. The application of the second coating composition can be done according to the manufacturers instructions, or, alternatively under similar conditions as were used during the application of the first electrocoat composition comprising a conductive pigment.

After application of the second layer of electrocoat composition, the coated substrate can be removed from the bath and rinsed with water. The applied layer can then be cured according to the manufacturers instructions or, alternatively, under similar conditions as were used for the curing of the first electrocoat composition comprising a conductive pigment.

The described process for applying two layer of electrocoat composition to a ferrous substrate can produce a corrosion resistant coating. If desired, additional coating compositions can be applied to the substrate including, but not limited to, primer composition, basecoat compositions, clearcoat compositions, glossy topcoat compositions other topcoat compositions and combinations thereof.

The applied two electrocoat compositions can provide the coated ferrous substrate with the corrosion resistance similar to or better than the corrosion resistance of a galvanized ferrous substrate having only one layer of electrocoat composition applied thereto. In some embodiments, the corrosion resistance is equal to or superior to that of a galvanized ferrous substrate having a single layer of the second electrocoat composition applied thereto.

EXAMPLES

Unless otherwise specified, all ingredients are available from the Aldrich Chemical Company, Milwaukee, Wis.

CORMAX® electrocoats and EC5000 electrocoats are available from DuPont, Wilmington, Del.

FOAMASTER® 111 defoamer is available from BASF, Florham Park, N.J.

BLANC FIXE® F pigment is available from Sachtleben Chemie GmbH, Duisburg, Germany.

K-WHITE® 140W pigment is available from the Tayca Corporation, Osaka, Japan.

Preparation of carbon black pigment pastes for use in conductive electrocoats:

TABLE 1

| Carbon Black pigment | Supplier | Particle Size (nm) | Surface Area (m²/g) | Oil Absorption (ml/100 g) |
|---|---|---|---|---|
| PRINTEX ® XE-2 | Degussa | 35 | 1000 | 400 |
| BLACK PEARLS ® 2000 | Cabot Corporation | 9 | 1022 | 320 |
| VULCAN ® CX-72 | Cabot Corporation | 30 | 254 | 188 |
| CONDUCTEX ® 975 Ultra | Columbian Chemicals | 21 | 242 | 169 |

Each of the above carbon black pigments of TABLE 1 were dispersed using the ingredients of TABLE 2 using the quaternary ammonium salt grind resin of U.S. Pat. No. 3,962,165 to form conductive pigment pastes.

TABLE 2

| Ingredient | Percent Solids | Parts by weight |
|---|---|---|
| Quaternary Ammonium salt grind resin | 58.0 | 149.71 |
| Deionized water |  | 275.43 |
| FOAMASTER ® 111 | 100.0 | 5.29 |
| Acetic acid | 25.0 | 16.52 |
| Dibutyltin dioxide paste | 44.31 | 108.73 |
| Carbon Black pigment paste | 100.0 | 137.65 |
| BLANC FIXE ® F | 100.0 | 161.74 |
| K-WHITE ® 140W | 100.0 | 10.32 |
| Deionized water |  | 134.61 |

The above ingredients were ground using Zirconia grinding media to Hegman No. 7 to 8. The pastes had 45% solids and a pigment to binder ratio of 3.25 to 1.

Each of the pigment pastes were then used to form a cationic electrocoat composition based in CORMAX® electrocoat emulsion, available from DuPont. To 1470.4 grams of the CORMAX® emulsion, was added 1993.5 grams of deionized water, followed by 536.1 grams of a pigment dispersion. Each of the cationic electrocoat compositions showed a pH of between 5.95 and 6.10 and had a solids content of 20%. The pigment to binder ratio was 30 to 100.

Zinc phosphated steel panels were electrocoated (100V-300V) in the conductive black bath at 90° F. (32° C.) bath temperature. The panels were rinsed with deionized water followed by baking at 360° F. (182° C.) by 10 min metal temperature. The conductivity of the cured films were measured using the Ransburg "sprayability meter" (model NO. 236). The meter is calibrated in Ransburg Units (RU) on a scale from 65 to 165. The optimum level of conductive carbon black needed to achieve a dry film conductivity of 130 to 150 RU is shown in Table 3.

TABLE 3

| Electrocoat composition | Percent conductive carbon black on cured film | Film Conductivity (RU) |
|---|---|---|
| PRINTEX ® XE-2 | 3.46 | 145 |
| BLACK PEARLS ® 2000 | 3.46 | 140 |
| VULCAN ® CX-72 | 9.23 | 150 |
| CONDUCTEX ® 975 Ultra | 9.23 | 140 |

The electrocoat composition containing VULCAN® CX-72 was found, based on several factors, including cost, to be the preferred low cost carbon black.

The electrocoat composition containing VULCAN® CX-72 was tested for corrosion resistance. The effect of conductive carbon black in the CORMAX® electrocoat on long term corrosion performance (20 cycle scab and 40 cycle accelerated) on zinc phosphated steel substrate was evaluated. The panels were baked at 330° F. (165° C., under bake), 360° F. (182° C., normal bake) and 390° F. (199° C., over bake) by 10 minutes metal temperature. CORMAX® electrocoat without conductive carbon black was used as a control. Table 4 presents the 20 cycle scab and 40 cycle accelerated corrosion results.

TABLE 4

|  |  | Electrocoat with VULCAN ® CX-72 | Control |
|---|---|---|---|
| 20 cycle scab corrosion | Under bake | 1.20 mm | 1.50 mm |
|  | Normal bake | 1.50 mm | 1.30 mm |
|  | Over bake | 1.40 mm | 1.60 mm |
| 20 cycle average creep over 3 baking temperatures |  | 1.37 mm | 1.47 mm |
| 40 cycle accelerated corrosion | Under bake | 2.80 mm | 2.60 mm |
|  | Normal bake | 1.90 mm | 2.30 mm |
|  | Over bake | 1.40 mm | 2.00 mm |
| 40 cycle average creep over 3 baking temperatures |  | 2.03 mm | 2.30 mm |

The electrocoat composition containing VULCAN® CX-72 was then tested using a 2-coat electrocoat process. EC5000® electrocoat, available from DuPont was used as the second electrocoat composition. In order to determine the minimum baking temperature for the conductivity of the first applied layer (containing the VULCAN® CX-72 conductive carbon black, the dry film conductivity of applied layers of electrocoat composition were tested as well as the dry film thicknesses. The results are shown in Table 5.

TABLE 5

| Baking temperature | Dry Film conductivity (RU) | Dry Film Thickness (micrometers) |
|---|---|---|
| 135° C. by 10 minutes metal temperature | 85 | 2.8 |
| 149° C. by 10 minutes metal temperature | 105 | 12.7 |
| 154° C. by 10 minutes metal temperature | 115 | 16.3 |
| 160° C. by 10 minutes metal temperature | 125 | 20.0 |
| 165° C. by 10 minutes metal temperature | 140 | 24.6 |

The results of Table 5 show that the minimum bake temperature for the electrocoat composition containing VULCAN® CX-72 in order to re-coat with a second layer of electrocoat composition is 149° C. by 10 minutes metal temperature.

The corrosion performance of a 2-coat electrocoat process was evaluated. For the first layer of electrocoat composition, the electrocoat composition containing VULCAN® CX-72 was used. After application to several zinc phosphated steel panels, the applied layer was rinsed with deionized water and cured at several temperatures, see Table 6. After drying and curing, the electrocoated panel was then coated with a layer of EC5000®. As a control, phosphate steel panels were coated with a layer of coated with a layer of CORMAX® VI electrocoat composition, rinsed with deionized water and then cured at several temperatures, see Table 6. The control panels were then cooled to room temperature and a layer of a high solids primer composition was applied and cured via the manufacturer's instructions. 20 cycle scab and 40 cycle accelerated corrosion was measured on all sets of panels.

TABLE 6

| | | 2-Coat Electrocoat system | Control |
|---|---|---|---|
| 20 cycle scab corrosion | 165° C. by 10 minute metal temp. | 1.44 mm | 1.49 mm |
| | 182° C. by 10 minute metal temp. | 1.38 mm | 1.16 mm |
| | 199° C. by 10 minute metal temp. | 1.26 mm | 1.36 mm |
| 20 cycle average creep over 3 baking temperatures | | 1.36 mm | 1.34 mm |
| 40 cycle accelerated corrosion | 165° C. by 10 minute metal temp. | 1.09 mm | 0.90 mm |
| | 182° C. by 10 minute metal temp. | 0.75 mm | 1.35 mm |
| | 199° C. by 10 minute metal temp. | 0.84 mm | 0.72 mm |
| 40 cycle average creep over 3 baking temperatures | | 0.89 mm | 0.99 mm |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A process for the coating of a ferrous substrate comprising the steps of:
   1) providing a first bath comprising a conductive pigment-containing electrocoat composition, wherein the conductive pigment-containing electrocoat composition comprises:
      A) conductive carbon black;
      B) a neutralized chain extended epoxy resin having a molecular weight, as measured as the weight per epoxy group, of from about 400 to about 5000; and wherein the conductive pigment-containing electrocoat composition has a carbon black to binder ratio by weight in the range of from 0.1:1 to 1:1, wherein the neutralized chain extended epoxy resin comprises two or more epoxy groups chain extended with amines that are neutralized with acid, and wherein the amines are carbamates;
   2) placing the ferrous substrate essentially free from a phosphate coating at least partially into the first bath;
   3) passing an electric current through the first bath and the ferrous substrate to deposit a layer of the conductive pigment-containing electrocoat composition onto at least a portion of the substrate;
   4) removing the ferrous substrate from the first bath;
   5) rinsing the coated substrate with water;
   6) heating the ferrous substrate to cure the applied layer of conductive pigment-containing electrocoat composition to form a cured applied layer of conductive pigment-containing electrocoat composition having a dry film conductivity of 130 to 150 Ransburg Units (RU);
   7) providing a second bath comprising a second electrocoat composition;
   8) placing the ferrous substrate at least partially into the second bath;
   9) passing an electric current through the second bath and the ferrous substrate to deposit a layer of the second electrocoat composition onto at least a portion of the cured applied layer of conductive pigment-containing electrocoat composition;
   10) removing the coated substrate from the second bath;
   11) rinsing the coated substrate with water; and
   12) heating the substrate to cure the applied layer or layers of electrocoat composition.

2. The process of claim 1 wherein the ferrous substrate is a cold rolled steel substrate that is free from any anti-corrosion coatings or free from any anti-corrosion treatments.

3. The process of claim 1 wherein the heating steps 6) and 12) are performed at a temperature in the range of from about 140° C. to about 240° C. for about 5 minutes to about 60 minutes.

4. The process of claim 1, wherein the conductive carbon black has an average particle size in the range of from about 10 nanometers to about 200 nanometers.

5. The process of claim 1 wherein the carbon black is dispersed using an alkylene oxide extended styrenated phenol.

6. The process of claim 1, wherein the conductive pigment-containing electrocoat composition has a carbon black to binder ratio by weight of 0.3 to 1.

7. The process of claim 1, wherein the conductive pigment-containing electrocoat composition has a pH of from 5.95 to 6.10 and has a solids content of 20%.

8. The process of claim 1 wherein the epoxy resin has a molecular weight, as measured as the weight per epoxy group, of from about 800 to about 3000.

9. The process of claim 1 wherein the amines are hydroxyalkyl carbamates.

10. The process of claim 1 wherein the amines are hydroxyalkyl carbamates having a formula according to (I):

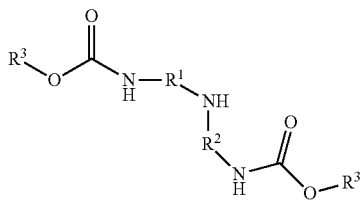

(I)

wherein R1 is an alkyl group having from 1 to 10 carbon atoms, R2 is an alkyl group having from 1 to 10 carbon atoms, and wherein each R3 is, independently, a hydroxyl alkyl group having in the range of from 1 to 10 carbon atoms.

11. A process for improving corrosion resistance of a substrate, the method comprising the steps of:
1) chain extending epoxy groups with amine groups, wherein the amine groups are carbamates, neutralizing the amine groups with acid to form neutralized chain extended epoxy resin, blending the neutralized chain extended epoxy resin and a crosslinking agent to form a film-forming binder, and providing a first bath comprising a conductive pigment-containing electrocoat composition, wherein the conductive pigment-containing electrocoat composition comprises the film-forming binder and conductive carbon black, wherein the neutralized chain extended epoxy resin has a molecular weight, as measured as the weight per epoxy group, of from about 400 to about 5000; and wherein the conductive pigment-containing electrocoat composition has a carbon black to binder ratio by weight of from 0.1:1 to 1:1;
2) placing a ferrous substrate essentially free from a phosphate coating at least partially into the first bath;
3) passing an electric current through the first bath and the ferrous substrate to deposit a layer of the conductive pigment-containing electrocoat composition onto at least a portion of the substrate;
4) removing the ferrous substrate from the first bath;
5) rinsing the coated substrate with water;
6) heating the ferrous substrate to cure the applied layer of conductive pigment-containing electrocoat composition to form a cured applied layer of conductive pigment-containing electrocoat composition having a dry film conductivity of 130 to 150 Ransburg Units (RU);
7) providing a second bath comprising a second electrocoat composition;
8) placing the ferrous substrate at least partially into the second bath;
9) passing an electric current through the second bath and the ferrous substrate to deposit a layer of the second electrocoat composition onto at least a portion of the cured applied layer of conductive pigment-containing electrocoat composition;
10) removing the coated substrate from the second bath;
11) rinsing the coated substrate with water; and
12) heating the substrate to cure the applied layer or layers of electrocoat composition.

12. The process of claim 11, wherein the ferrous substrate is a cold rolled steel substrate that is free from any anti-corrosion coatings or free from any anti-corrosion treatments.

13. The process of claim 11, wherein the conductive pigment-containing electrocoat composition has a carbon black to binder ratio by weight of 0.3 to 1.

14. The process of claim 11 wherein the epoxy resin has a molecular weight, as measured as the weight per epoxy group, of from about 800 to about 3000.

15. The process of claim 11 wherein the amine groups are hydroxyalkyl carbamates.

16. The process of claim 11 wherein the amine groups are hydroxyalkyl carbamates having a formula according to (I):

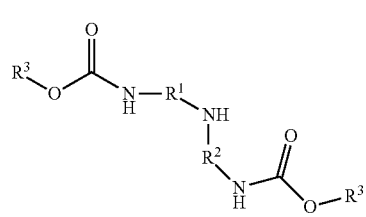

(I)

wherein R1 is an alkyl group having from 1 to 10 carbon atoms, R2 is an alkyl group having from 1 to 10 carbon atoms, and wherein each R3 is, independently, a hydroxyl alkyl group having in the range of from 1 to 10 carbon atoms.

* * * * *